(12) United States Patent
Warloe et al.

(10) Patent No.: US 7,065,629 B2
(45) Date of Patent: Jun. 20, 2006

(54) ADDRESS TRANSLATION LOGIC FOR USE IN A GPS RECEIVER

(75) Inventors: Andreas Warloe, Fountain Valley, CA (US); Michael J. Field, Huntington Beach, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 534 days.

(21) Appl. No.: 10/298,983

(22) Filed: Nov. 18, 2002

(65) Prior Publication Data

US 2004/0098558 A1    May 20, 2004

(51) Int. Cl.
G06F 12/00    (2006.01)

(52) U.S. Cl. ............. 711/202; 342/357.1; 342/357.12; 342/357.15; 375/150

(58) Field of Classification Search ............... 711/202; 708/422; 455/78; 342/357.09, 357.12, 130
See application file for complete search history.

(56) References Cited

U.S. PATENT DOCUMENTS

| | | | |
|---|---|---|---|
| 4,998,111 A | 3/1991 | Ma et al. .................... 342/352 |
| 5,535,237 A | 7/1996 | LaPadula, III et al. ..... 375/200 |
| 5,537,121 A | 7/1996 | Lennen ........................ 342/357 |
| 5,592,173 A | 1/1997 | Lau et al. .................... 342/357 |
| 5,663,734 A | 9/1997 | Krasner ....................... 342/357 |
| 5,736,956 A | 4/1998 | Kennedy et al. .............. 342/90 |
| 5,805,108 A | 9/1998 | Lennen ........................ 342/357 |
| 5,832,375 A | 11/1998 | Leisten et al. ............... 455/314 |
| 6,107,960 A | 8/2000 | Krasner ................. 342/357.09 |
| 6,442,375 B1 | 8/2002 | Parmentier ................... 455/78 |
| 6,466,958 B1 | 10/2002 | Van Wechel et al. ....... 708/422 |
| 6,535,837 B1 | 3/2003 | Schach Von Wittenau .. 702/180 |
| 6,556,942 B1 | 4/2003 | Smith .......................... 702/150 |
| 6,760,364 B1 | 7/2004 | Kohli et al. ................. 375/150 |
| 6,772,315 B1 * | 8/2004 | Perego ........................ 711/207 |

(Continued)

FOREIGN PATENT DOCUMENTS

EP    1122554 A1    8/2001

OTHER PUBLICATIONS

Starzyk, J.A. and Zhu, Z., "Averaging Correlation for C/A Code Acquisition and Tracking in Frequency Domain," Proceedings of the 44th IEEE 2001 Midwest Symposium on Circuits and Systems, vol. 2, pp. 905-908, Dayton, Ohio, Aug. 14-17, 2001.

Primary Examiner—Kevin Verbrugge
Assistant Examiner—Mehdi Namazi
(74) Attorney, Agent, or Firm—Withrow & Terranova, PLLC

(57) ABSTRACT

The address translation logic of the present invention is incorporated in a global positioning system (GPS) receiver and operates to group data in memory based on translating the address from a direct memory access controller. The data includes post-correlated samples of the correlation of a signal with a generated frequency and a generated code having a plurality of time offsets. In general, the address translation logic organizes the data such that each element of the data associated with particular ones of the plurality of time offsets are grouped together in order to improve the efficiency of performing a fast Fourier transform of the data. In addition, the address translation logic allows the transfer of data from correlation circuitry to memory, from the memory to an FFT module, and from the FFT module to the memory using standard DMA controllers.

20 Claims, 8 Drawing Sheets

U.S. PATENT DOCUMENTS

| | | | |
|---|---|---|---|
| 6,831,705 B1 | 12/2004 | Yamamoto | 348/731 |
| 6,856,794 B1 | 2/2005 | Tso et al. | 455/260 |
| 2003/0050949 A1* | 3/2003 | Van Wechel et al. | 708/622 |
| 2003/0227963 A1 | 12/2003 | Dafesh | 375/149 |

* cited by examiner

| | $S_0$ | $S_1$ | $S_2$ | $S_3$ | | $S_{M-1}$ (M=64) |
|---|---|---|---|---|---|---|
| $OFFSET_0$ | $DATA_{0,0}$ | $DATA_{0,1}$ | $DATA_{0,2}$ | $DATA_{0,3}$ | | $DATA_{0,63}$ |
| $OFFSET_1$ | $DATA_{1,0}$ | $DATA_{1,1}$ | $DATA_{1,2}$ | $DATA_{1,3}$ | | $DATA_{1,63}$ |
| $OFFSET_2$ | $DATA_{2,0}$ | $DATA_{2,1}$ | $DATA_{2,2}$ | $DATA_{2,3}$ | | $DATA_{2,63}$ |
| ⋮ | ⋮ | ⋮ | ⋮ | ⋮ | ⋮ ⋮ ⋮ | ⋮ |
| $OFFSET_{47}$ | $DATA_{47,0}$ | $DATA_{47,1}$ | $DATA_{47,2}$ | $DATA_{47,3}$ | | $DATA_{47,63}$ |

*FIG. 4*

ADDRESS TRANSLATION LOGIC FOR USE IN A GPS RECEIVER

CROSS-REFERENCE TO RELATED PATENT APPLICATIONS

This U.S. patent application is related to the following concurrently filed U.S. patent applications:

i) U.S. patent application Ser. No. 10/298,447, entitled USING FFT ENGINES TO PROCESS DECORRELATED GPS SIGNALS TO ESTABLISH FREQUENCIES OF RECEIVED SIGNALS, filed Nov. 18, 2002, now issued as U.S. Pat. No. 6,806,827;

ii) U.S. patent application Ser. No. 10/298,415, entitled SAVING POWER IN A GPS RECEIVER BY CONTROLLING DOMAIN CLOCKING, filed Nov. 18, 2002, currently abandoned;

iii) U.S. patent application Ser. No. 10/298,414, entitled AVOIDING INTERFERENCE TO A GPS RECEIVER FROM WIRELESS TRANSMISSIONS BY TIME MULTIPLEXING GPS RECEPTION, filed Nov. 18, 2002, now issued as U.S. Pat. No. 6,825,802; and iv) U.S. patent application Ser. No. 10/298,444, entitled GPS RECEIVER, filed Nov. 18,2002, now issued as U.S. Pat. No. 6,778,135, wherein these related U.S. patent applications are incorporated herein by reference in their entireties.

FIELD OF THE INVENTION

The present invention relates to a GPS receiver, and in particular to address translation logic operating to group post correlation data in memory in order to improve the efficiency of a fast Fourier transform of the data.

BACKGROUND OF THE INVENTION

The global positioning system (GPS) is based on an earth-orbiting constellation of twenty-four satellite vehicles each broadcasting its precise location and ranging information. From any location on or near the earth, a GPS receiver with an unobstructed view of the sky should be able to track at least four satellite vehicles, thereby being able to calculate the receiver's precise latitude, longitude, and elevation. Each satellite vehicle constantly transmits two signals, generally referred to as L1 and L2. The L1 signal from a satellite vehicle contains a unique pseudo-random noise code ranging signal (C/A code) with a chipping frequency of 1.023 MHz, system data with a bitrate frequency of 50 Hz, and an encrypted precise-code (y-code) with a chipping frequency of 10.23 MHz all being modulated onto a carrier frequency of 1575.42 MHz. The L2 signal consists of the system data and y-code being modulated onto a carrier frequency of 1227.60 MHz.

In order to calculate a three-dimensional location, a receiver must determine the distance from itself to at least four satellite vehicles. This is accomplished by first determining the location of at least four satellite vehicles using ephemeris data received from the satellites. Once the locations of the satellites have been determined, the distance from the receiver to each of the satellites is calculated based upon the current estimate of receiver position. The measurement of the distance from the receiver to a satellite is based on the amount of time that elapsed between the transmission of a ranging signal from each satellite vehicle and the reception of that chip symbol by the receiver. In particular, the estimated position of the receiver is then corrected based upon a time epoch associated with the received ranging signal.

In order to acquire the L1 or L2 signal, the receiver must match the C/A code or y-code carried in the L1 signal, or the y-code carried in the L2 signal, with an internally generated code. For the C/A code, this is typically done by correlating the two signals by shifting the generated code through the 1023 possible time offsets of the C/A code until the generated code matches the C/A code carried in the L1 signal. To improve the performance of the search, the generated code may be shifted at shorter intervals than a whole chip. For example, 2046 one-half chip positions may be searched. At the time offset when the generated code matches the C/A code carried in the L1 signal, the two signals will cancel out, leaving only the carrier frequency and system data.

In addition to finding the time offset of the C/A code or y-code carried in the L1 signal or the y-code carried in the L2 signal, the frequency of the received L1 or L2 signal is typically determined. This may be done by generating a local L1 or L2 signal, and correlating this, together with the generated C/A or Y code with the received signal. Because of the movement of the satellite vehicles relative to the earth, the received frequency will experience a Doppler shift of +/−4,500 Hz from the transmitted frequency of the L1 or L2 signal. Another source of frequency uncertainty is the imperfection of the local oscillator, which typically can add a frequency offset of +/−20 ppm, or +/−30 kHz. However, a good part of this offset is due to variations in temperature, and may be modeled by a GPS receiver with a temperature sensor. With this modeling, the remaining temperature uncertainty could be around 10 kHz. Receiver movement may also cause a Doppler effect, however, this effect is usually insignificant when compared to the movement of the satellite vehicles in a commercial application. Due to the conventional method of the GPS signal detection, the receiver generated L1 or L2 signal needs to be within less that 500 Hz of the received signal for a successful search. Typically the frequency of the generated signal is incremented in 750 Hz intervals as the receiver searches for the correct code/carrier combination.

Therefore, a two-dimensional search of an approximately 30,000 Hz frequency range and the possible time offsets of the C/A code or the y-code must be made in order to acquire the L1 or L2 signal. Some GPS receivers have been designed to concurrently search all possible time offsets for the C/A code in the L1 signal at a single frequency, thereby requiring an enormous number of correlators. After searching all 1023 or more time offsets at one frequency, the frequency is changed and the process is repeated until a satellite is found or the approximately 30,000 Hz frequency range has been searched. While this approach works well in most cases, new applications for GPS receivers are more likely to have access to a precise time source, narrowing the time, or code position, window that needs to be searched. At the same time, a drive to lower system cost by using cheaper oscillators with larger frequency errors maintains the need to quickly search a wide frequency range. Thus, there remains a need for a GPS receiver capable of concurrently searching the approximately 30,000 Hz range of frequencies to determine the precise frequency of the L1 or L2 signal, while having a modest number of correlators used to determine the time offset of the C/A code or the y-code carried in the L1 or the y-code in carried in the L2 signal.

SUMMARY OF THE INVENTION

The address translation logic of the present invention is incorporated in a global positioning system (GPS) receiver and operates to group data in memory based on translating the address from a direct memory access controller. The data includes post-correlated samples of the correlation of a signal with a generated frequency and a generated code having a plurality of time offsets. In general, the address translation logic organizes the data such that each element of the data associated with particular ones of the plurality of time offsets are grouped together in order to improve the efficiency of performing a fast Fourier transform of the data. In addition, the signal correlated with the generated frequency and the generated code having the plurality of time offsets may be a baseband signal that is a baseband representation of a received GPS signal.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 4 illustrates data from correlation circuitry during a two-dimensional search for a frequency and time offset of a received signal according to one embodiment of the present invention;

Figure 7:
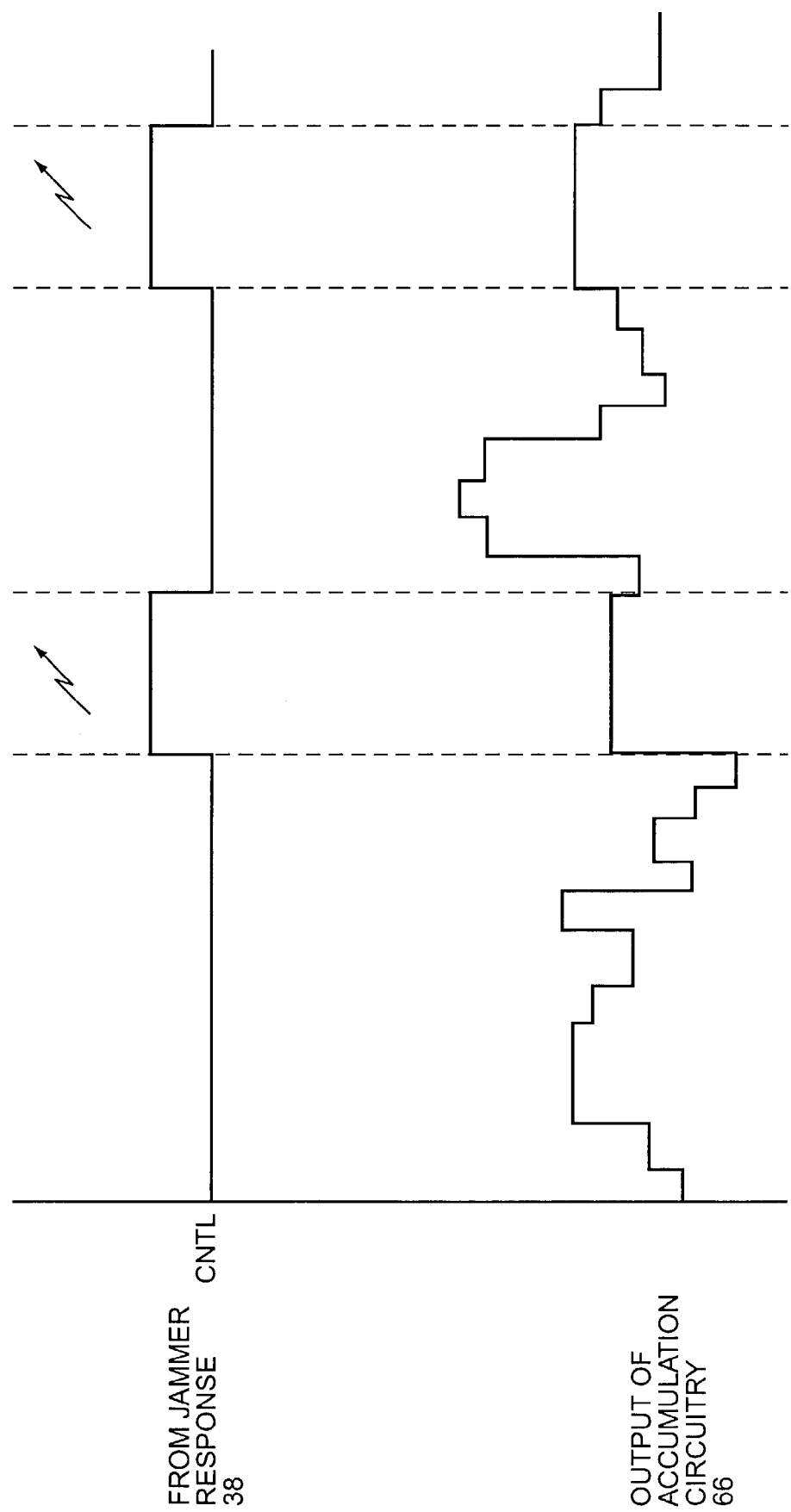
Figure 8:
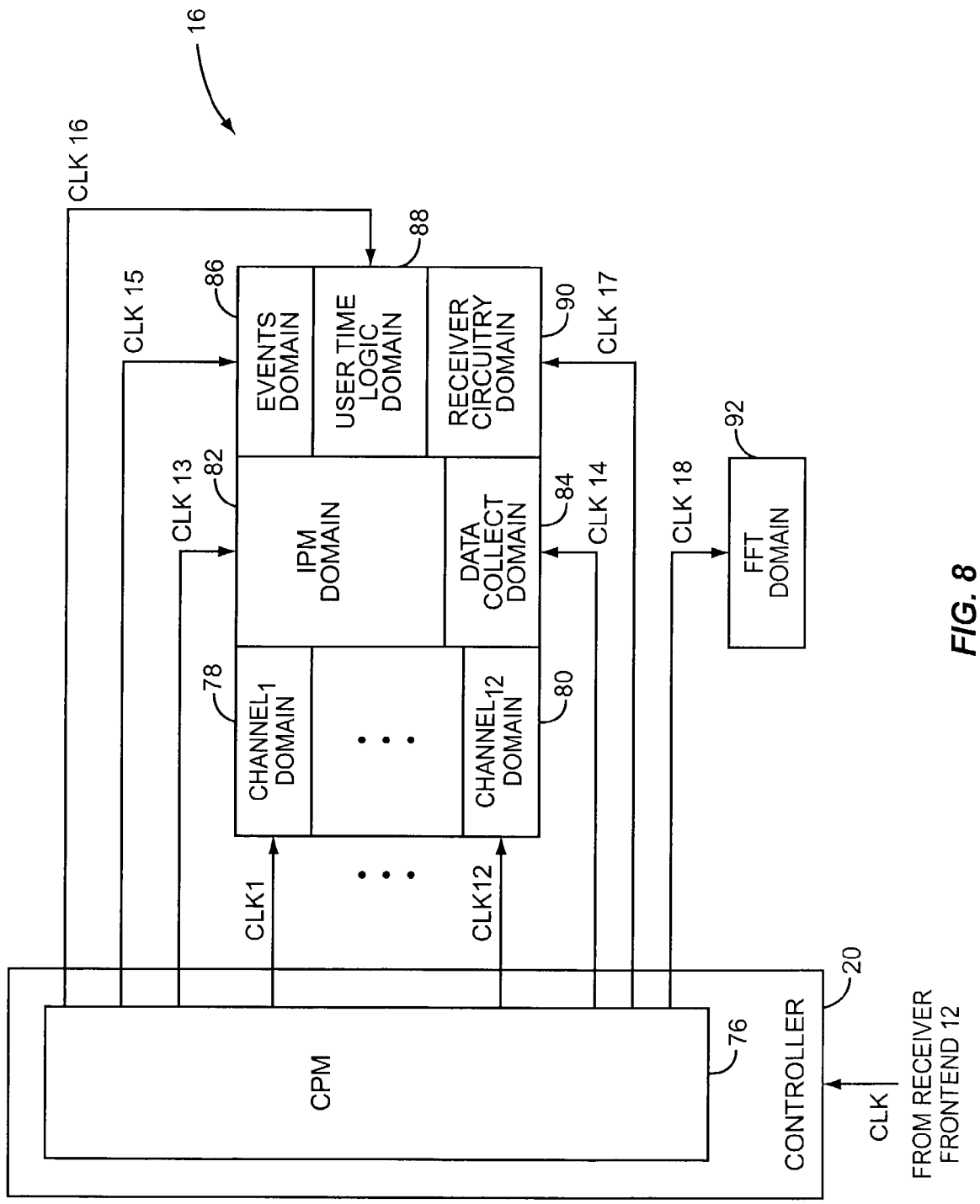

FIG. 7 graphically illustrates the output of accumulation circuitry in response to detection of a jamming interference signal according to one embodiment of the present invention; and FIG. 8 illustrates a clock and power management module controlling clock signals associated with exemplary domains of a GPS receiver according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
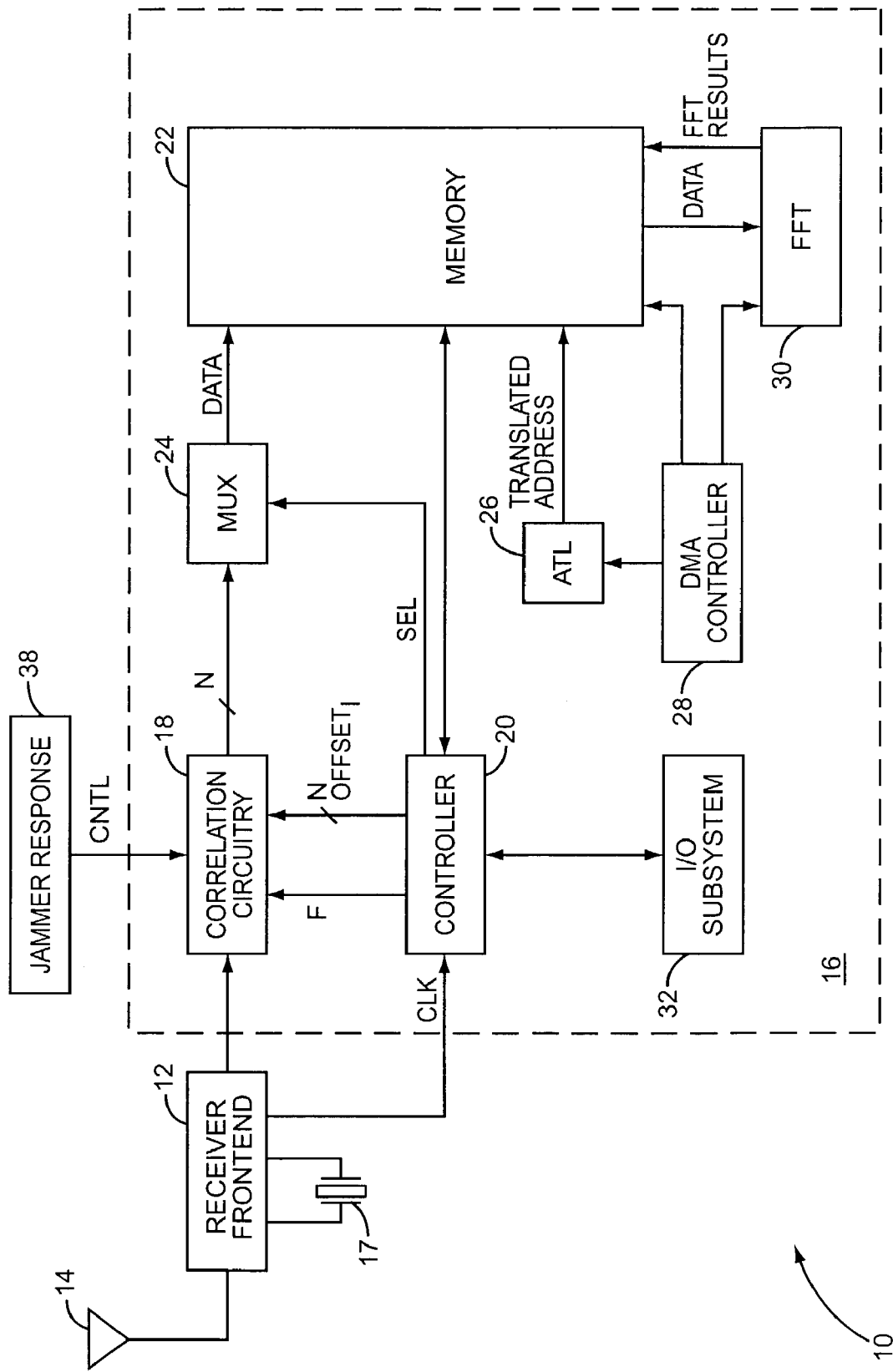
FIG. 1 illustrates a block diagram of a GPS receiver according to one embodiment of the present invention.

The present invention is preferably incorporated in a GPS receiver 10. The basic architecture of a GPS receiver 10 is represented in FIG. 1 and may include a receiver frontend 12, an antenna 14, and a digital application specific integrated circuit (ASIC) 16. The receiver frontend 12 receives information previously modulated on a radio frequency carrier from one or more satellite vehicles through antenna 14. The received signal is amplified, filtered, downconverted, and digitized by the receiver frontend 12 to produce a digital baseband signal representative of the received signal. The receiver frontend 12 also produces a clock (CLK) signal based on a signal from a local oscillator 17. The frequency uncertainty of the local oscillator 17 is a major source of the frequency uncertainty of the received signal.

The digital ASIC 16 processes the digitized baseband signal to extract the information and data bits conveyed in the received signal. Correlation circuitry 18 communicates with a controller 20 to perform such operations as decimation, demodulation, correlation, and accumulation. The controller 20 is interfaced to memory 22, which may include random-access memory (not shown) and read-only memory (not shown) and may alternatively be internal to the controller 20. The memory 22 is used by the controller 20 to store GPS related information such as ephemeris data, almanac data, last known position, etc. Further, the memory 22 may store program instructions to be executed by the controller 20.

The N parallel outputs from the correlation circuitry 18 are multiplexed by the multiplexer (MUX) 24, which is controlled by a select signal (SEL) from the controller 20, into a serial stream of data (DATA) and transferred to addresses in the memory 22. The addresses where the data is stored are determined by using address translation logic (ATL) 26 to translate addresses from a direct memory access (DMA) controller 28. Once the data is stored in the memory 22, fast Fourier transform (FFT) circuitry 30 retrieves the data via the DMA controller 28 and produces transformed data, which is the result of the fast Fourier transform of the data. The result of the FFT process is stored in the memory 22 via the DMA controller 28 for use by the controller 20. Additionally, the controller 20 is operatively connected to an input/output (I/O) subsystem 32 in order to communicate with external devices.

Jammer response circuitry 38 provides a control signal (CNTL) to the correlation circuitry 18 when a transmission from a nearby wireless communication device is detected. In another embodiment, the jammer response circuit 38 may be part of a wireless communication device, such as a mobile telephone, capable of asserting the control signal CNTL while transmitting. However, the jammer response circuit 38 may be any circuit or device that is capable of detecting a transmission of a jamming interference signal.

Figure 2:
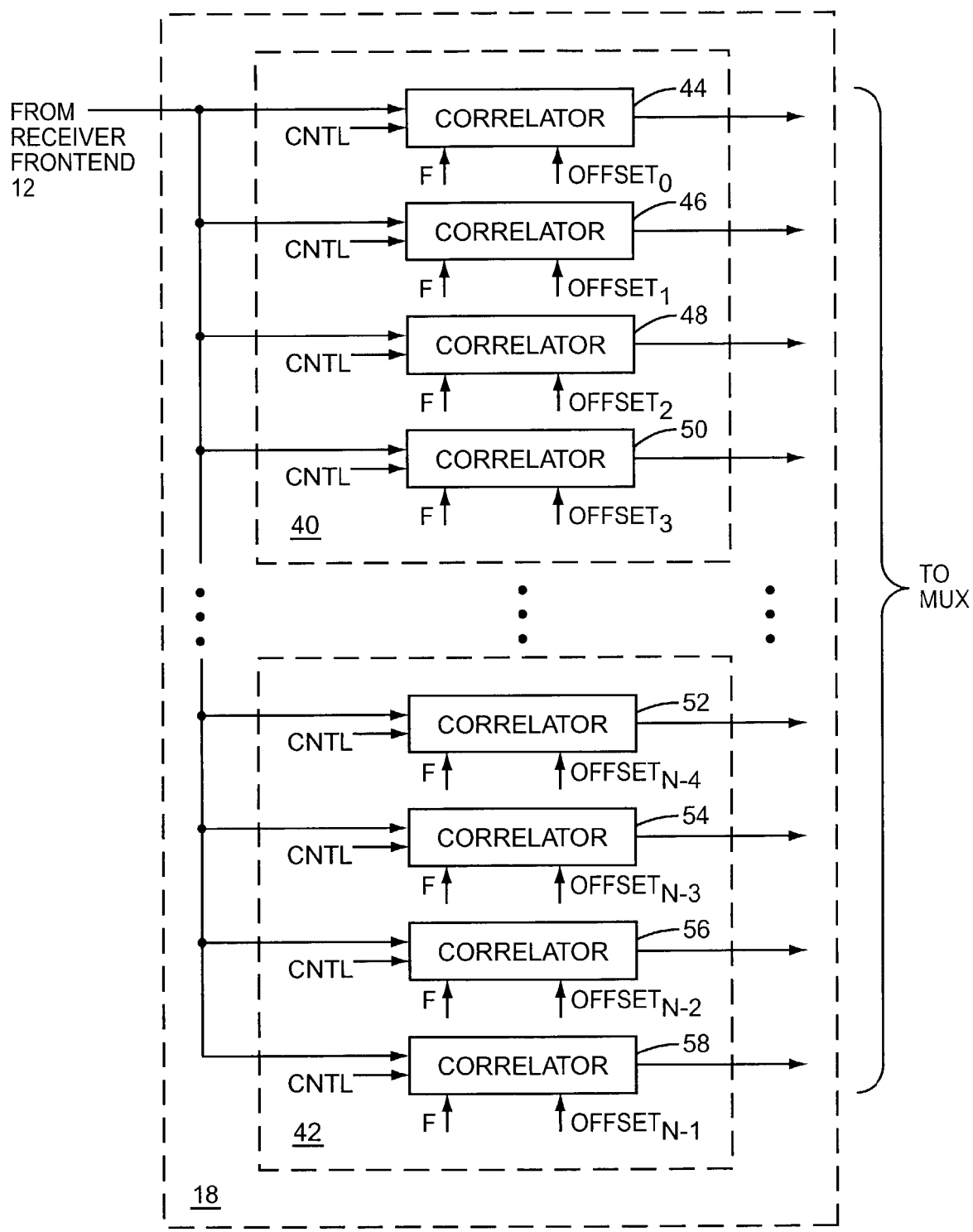
FIG. 2 illustrates a block diagram of correlation circuitry associated with a GPS receiver according to one embodiment of the present invention.

FIG. 2 illustrates the correlation circuitry 18 in more detail. The correlation circuitry 18 includes a number of correlators N having been divided into N/4 channels each having four correlators. As an example, a first channel 40 and a last channel 42 each have four correlators 44, 46, 48 and 50 and 52, 54, 56 and 58, respectively. Each of the correlators 44, 46, 48, 50, 52, 54, 56 and 58 is capable of correlating the baseband signal from the receiver frontend 12 with a generated frequency (F) and a pseudo random noise code having a time offset ($OFFSET_I$) generated by the controller 20, where I=0, 1, 2, . . . N−1. Further, each of the correlators 44, 46, 48, 50, 52, 54, 56 and 58 is controlled by the control signal CNTL from the jammer response circuit 38 such that the correlation process pauses during transmissions from the nearby wireless communication device. While only the first channel 40 and the last channel 42 are illustrated, it should be clear that the correlation circuitry 18 includes N/4 channels, each being essentially the same as the channels 40 and 42 described above.

Figure 3:
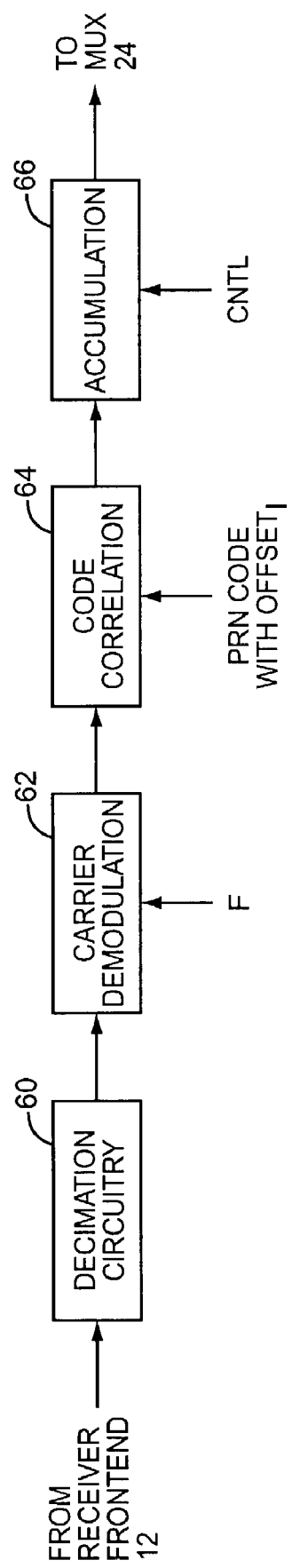
FIG. 3 illustrates a correlator associated with a GPS receiver according to one embodiment of the present invention.

A more detailed illustration of each of the correlators 44, 46, 48, 50, 52, 54, 56 and 58 is given in FIG. 3. Each of the correlators 44, 46, 48, 50, 52, 54, 56 and 58 may include decimation circuitry 60, carrier demodulation circuitry 62, code correlation circuitry 64, and accumulation circuitry 66. The decimation circuitry 60 receives the baseband signal from the receiver frontend 12 and decimates a sample rate of the received signal to a decimated rate equal to or less than the sample rate. After decimation, the carrier demodulation circuitry 62 demodulates the decimated baseband signal using the generated frequency F from the controller 20, thereby providing a demodulated baseband signal to the code correlation circuitry 64.

The code correlation circuitry 64 correlates the demodulated baseband signal with the generated pseudo-random noise (PRN) code from the controller 20 having the time offset $OFFSET_I$. Further, each of the correlators 44, 46, 48, 50, 52, 54, 56 and 58 may demodulate the decimated baseband signal using the same generated frequency F, but may correlate the demodulated baseband signal with the generated code having different time offsets $OFFSET_I$. The output of the code correlation circuitry 64 is accumulated for an amount of time, which depends on the particular design of the GPS receiver 10, and transferred to the memory 22 via the multiplexer 24. In one embodiment, the amount of time the output of the code correlation circuitry 64 is accumulated is 32 µs, which is discussed in detail below. The accumulated output of the accumulation circuitry 66 is at a maximum when the frequency F and the time offset $OFFSET_I$ match the frequency and time offset of the baseband signal from the receiver frontend 12.

Establishing the Frequency and Time Offset of GPS Signals

According to one embodiment, the GPS receiver 10 of the present invention is capable of concurrently searching an approximately 30,000 Hz range of frequencies for the baseband signal received from the receiver frontend 12. Further, the GPS receiver 10 is capable of performing a two-dimensional search for both the frequency of the baseband signal and the time offset of the C/A code or the y-code carried in the received signal. For this example, the received signal includes up to twelve L1 signals, the baseband signal is a baseband digital representation of the received signal, and the generated code from the controller 20 is the C/A code corresponding to a particular one of the L1 signals. In addition, the number of correlators is 48 (N=48), thereby defining 12 (N/4) channels.

FIG. 4 illustrates a data set consisting of the data produced by the correlation circuitry 18 during the two-dimensional search performed by the digital ASIC 16 in the GPS receiver 10. Each row is the output over time of one of the 48 correlators, examples of which are the correlators 44, 46, 48, 50, 52, 54, 56 and 58. Each column is a partial correlation sample period $S_0 \ldots S_{M-1}$. Additionally, the data elements $DATA_{X,Y}$, or partial correlation samples, can be any number of bits, where the subscript X=0, 1, . . . N−1 corresponds to the time offset $OFFSET_I$ and the subscript Y=0, 1, . . . M−1 corresponds to the partial correlation sample periods $S_0$, $S_1$, . . . $S_{M-1}$ and M is the number of points in the FFT operation.

In this example, each of the correlators 44, 46, 48, 50, 52, 54, 56 and 58 correlate the received signal with the generated frequency F and the generated PRN code having a different time offset $OFFSET_I$ for a total of 2 ms. However, the correlators 44, 46, 48, 50, 52, 54, 56 and 58 accumulate the results of the correlation and provide the data elements $DATA_{X,Y}$, also called partial correlation samples, at 32 µs intervals, thereby defining the partial correlation sample periods. By producing 64 partial correlation samples at 32 µs intervals, the correlators 44, 46, 48, 50, 52, 54, 56 and 58 have effectively correlated the baseband signal with the generated frequency F and the generated PRN code having a different time offset $OFFSET_I$ for a total of 2 ms.

If each partial correlation sample $DATA_{X,Y}$ is a 32 µs accumulation of the results of the correlated data, 64 partial correlation samples may be processed by the FFT circuitry 30 by performing a 64-point FFT operation to accomplish a search over an approximately 30,000 Hz frequency range for each of the time offsets corresponding to each of the 48 correlators. The frequency separation, or bin width, of the results of the 64-point FFT operation is 1/(M×T), where M is the number of points in the FFT operation and T is equal to the partial correlation sample period. Therefore, the frequency separation of this 64-point FFT operation is approximately 500 Hz, and the frequency range covered by the operation is approximately 30,000 Hz (64×500 Hz=30,000 Hz). The frequency range covered by the FFT operation corresponds to the approximately 30,000 Hz range of frequencies containing the received signal. Although the two are not centered at the same frequency, the results of the FFT operation can be used to determine the location of the frequency of the received signal within the approximately 30,000 Hz range of frequencies.

In operation, the two-dimensional search begins when the controller 20 sets the generated frequency F to a nominal frequency associated with the baseband signal from the receiver frontend 12 and sends the generated code with offsets $OFFSET_0$, $OFFSET_1$ . . . $OFFSET_{47}$ to the correlation circuitry 18. It is to be understood that the controller 20 can set the generated frequency F to any of a plurality of frequencies. In addition, the controller 20 is capable of generating a different generated frequency F for each of the channels 40 and 42.

Once, the generated frequency F and time offsets $OFFSET_I$ have been sent to the correlation circuitry 18, the accumulation circuitry 66 of each of the correlators 44, 46, 48, 50, 52, 54, 56 and 58 accumulates the output of the code correlation circuitry 64 for a the partial correlation period $S_0$ of the C/A code, thereby producing the partial correlation samples $DATA_{X,0}$. In this example, the partial correlation period is approximately 32 µs or 33 C/A code chips. The accumulated outputs of partial correlation samples from the correlators 44, 46, 48, 50, 52, 54, 56 and 58 are serially transferred by the multiplexer 24 to the addresses in the memory 22 determined by the address translation logic 26. This process is repeated 64 times for each of the partial correlation sample periods $S_0 \ldots S_{M-1}$ to produce the data set for the 64-point FFT operation performed by the FFT circuitry 30. A total correlation period for the data set is 2 ms (32 µs×64).

After the partial correlation samples $DATA_{X,Y}$ have been stored for each of the partial correlation periods $S_0 \ldots S_{M-1}$ and the offsets $OFFSET_0$ . . . $OFFSET_{47}$, the data is transferred to the FFT circuitry 30 from the memory 22 using the DMA controller 28. The FFT circuitry 30 performs the 64-point FFT operation on the data from each of the correlators 44, 46, 48, 50, 52, 54, 56 and 58 and transfers the results (FFT RESULTS) back to the memory 22 using the DMA controller 28. This completes one iteration of the two-dimensional search, which has searched the approximately 30,000 Hz range of frequencies and the 48 time offsets. The controller may now determine if the received signal was present at any of the frequency/time/PRN combinations in the data set.

Several more iterations of the two-dimensional search can be performed to search each possible time offset of the 1023 chip C/A code. For example, if the C/A code is searched in ½ chip steps, 2046 time offsets will be searched. Each iteration searches 48 new time offsets until all time offsets have been searched. After each of the possible time offsets has been searched, the controller 20 can then determine the frequency F and time offset $OFFSET_I$ of the baseband signal from the receiver frontend 12 by processing the results from the FFT circuitry 30 for each iteration. The frequency F and time offset $OFFSET_I$ can be stored in the memory 22 to be accessed by the controller 20.

Typically, the GPS receiver 10 will attempt the search for and acquire signals from more than one satellite, each having a different C/A code. Further, the C/A code (or PRN) of the received signals may not be known. Therefore, the GPS receiver 10 may perform more than one successive two-dimensional search. For each successive search, the two-dimensional search described above is repeated with controller 20 sending different generated codes corresponding to possible C/A codes associated with each of the received L1 signals to the correlation circuitry 18. Once the desired number of two-dimensional searches has been completed, each received L1 signal is then tracked by the GPS receiver 10 using the channels, examples of which are the channels 40 and 42, where each of the channels is capable of tracking one of the received L1 signals.

Address Translation Logic (ATL)

If the data from only one of the correlators 44, 46, 48, 50, 52, 54, 56, and 58 were to be transferred to the FFT circuitry 30, the data transfer could be fully automated with standard DMAs set up by the controller 20. However, if the data is transferred from the correlators 44, 46, 48, 50, 52, 54, 56 and 58 in parallel and is multiplexed into the serial stream of data to be transferred to the memory 22 with the DMA controller 28, the resulting data blocks will have interleaved data from all of the correlators 44, 46, 48, 50, 52, 54, 56 and 58. Without the ATL 26, the data would need to be re-grouped manually by the controller 20, increasing the need for system throughput, or de-multiplexed into as many FFT modules as there are correlators. The address translation logic 26 allows the FFT of the data associated with the parallel correlators 44, 46, 48, 50, 52, 54, 56 and 58 to be performed by the single FFT circuitry 30 rather than having numerous of FFT modules processing the data in parallel, or having the controller manually reorganize the data before it is processed by the FFT circuitry 30. By doing so, the overall size of the GPS receiver 10 and the power consumed by the GPS receiver 10 is reduced.

Figure 5:
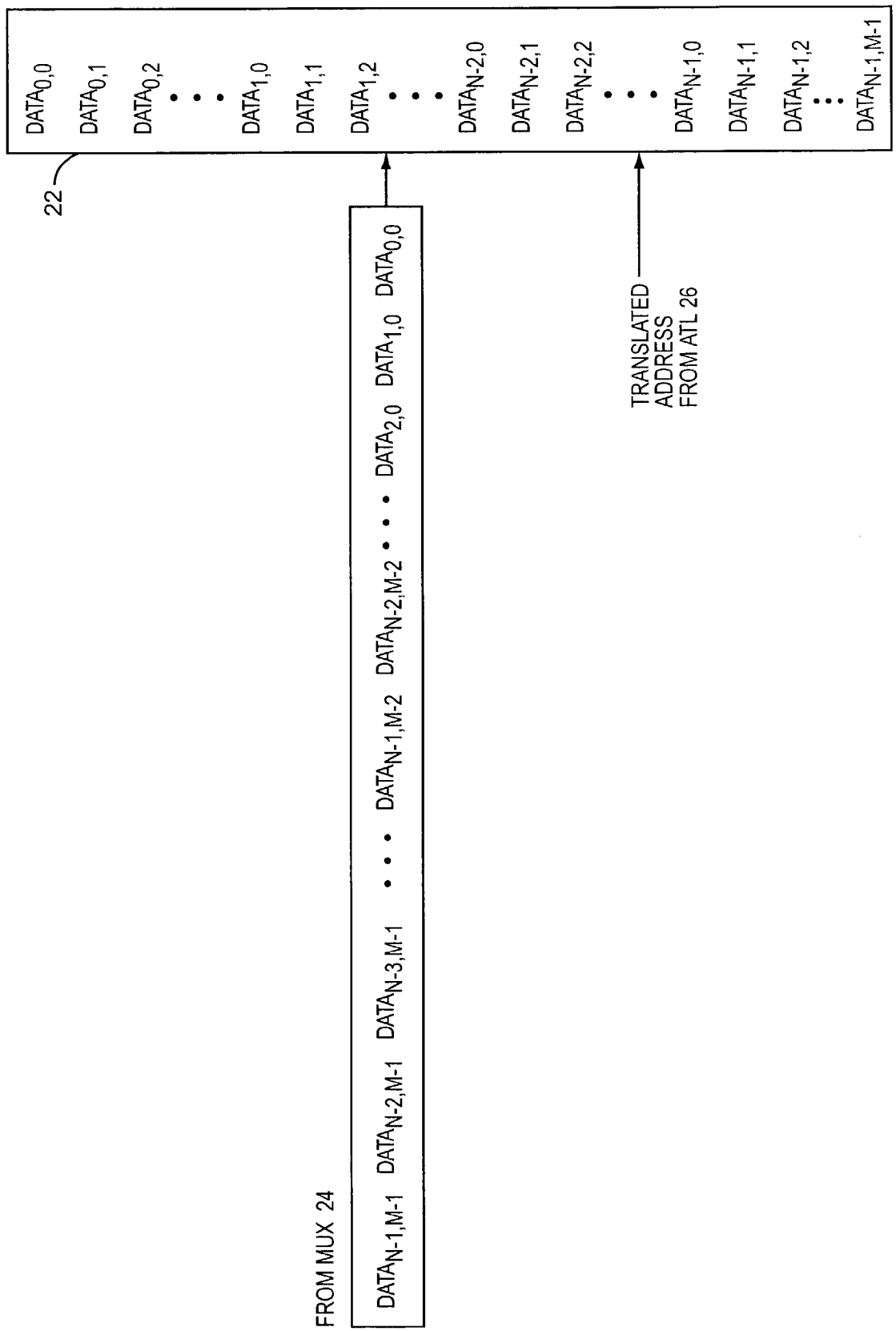
FIG. 5 illustrates the functionality of address translation logic associated with a GPS receiver according to one embodiment of the present invention.

The address translation logic 26 translates the addresses from the DMA controller 28 without intervention from the controller 20 such that consecutive data from each of the forty-eight correlators, examples of which are the correlators 44, 46, 48, 50, 52, 54, 56 and 58, is stored in consecutive memory locations, as illustrated in FIG. 5. By doing so, all of the data relating to a particular time offset $OFFSET_I$ are grouped together in the memory 22, enabling efficient transfer to the FFT circuitry 30. For example, the data elements, also referred to as the partial correlation samples, received consecutively from the correlation of the time offset $OFFSET_0$ are defined as $DATA_{0,0}$, $DATA_{0,1}$, $DATA_{0,2}$ ... $DATA_{0,M-1}$. The address translation logic 26 operates to store these data elements in consecutive locations in the memory 22. Without the address translation logic 26, the data from the correlation circuitry 18 would be stored in the order it is received by the memory 22, which would require the controller 20 to reorganize the data before sending the data to the FFT circuitry 30.

Using FIG. 5 as an example, the data elements $DATA_{X,Y}$ corresponds to the data from the accumulation of the correlation of the received signal with the PRN code having the time offset $OFFSET_I$ and the generated frequency F, where the subscript X corresponds to the time offset $OFFSET_I$ and the subscript Y corresponds to the partial correlation sample period. The data is transferred such that the data is grouped by the partial correlation sample period corresponding to the subscript Y, where Y=0, 1, 2, ... M−1. For example, the partial correlation samples produced by the correlation of the received signal with the PRN code having each of the time offsets $OFFSET_I$ at the partial correlation sample period $S_0$, $DATA_{0,0}$, $DATA_{1,0}$, $DATA_{2,0}$, ... $DATA_{N-1,0}$, are grouped together when received by the memory 22. Using the translated address from the address translation logic 26, the memory 22 stores the data transmitted serially from the multiplexer 24 such that the partial correlation samples are grouped by the time offset $OFFSET_I$ corresponding to the subscript X. For example, the partial correlation samples associated with the time offset $OFFSET_0$ corresponding to the subscript X, $DATA_{0,0}$, $DATA_{0,1}$, $DATA_{0,2}$, ... $DATA_{0,M-1}$, are grouped together in the memory 22.

Avoiding Interference to a GPS System from Wireless Transmissions

Figure 6:
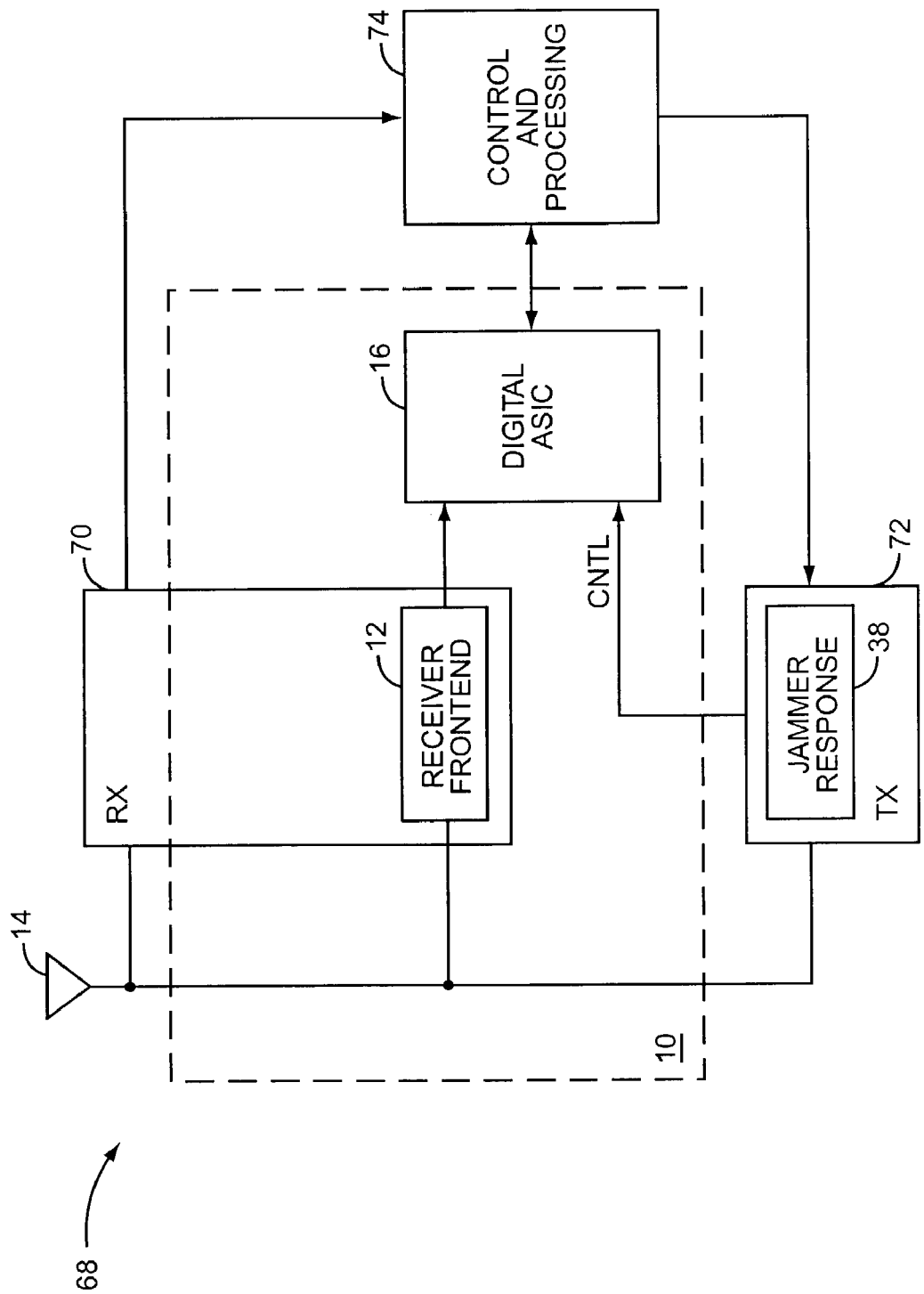
FIG. 6 illustrates a GPS receiver incorporated in a wireless communications device according to one embodiment of the present invention.

FIG. 6 is a simplified block diagram of the GPS receiver 10 being used in combination with a wireless communications device 68, such as a mobile telephone. The wireless communications device 68 may include receive (RX) circuitry 70, transmit (TX) circuitry 72, and control and processing circuitry 74. The receive circuitry 70 operates to receive the GPS signal and any communication signals. The transmit circuitry 72 operates to transmit communication signals from the wireless communications device 68. The control and processing circuitry 74 operates to process the communications signals sent to the wireless communications device 68 and send communications data to the transmit circuitry 72 to be transmitted as the communications signals. The receive circuitry 70 and the transmit circuitry 72 are shown to use the antenna 14, which is also used to receive the GPS signal. However, the receive circuitry 70 and the transmit circuitry 72 may use a separate antenna (not shown) to transmit and receive the communication signals.

When a jamming signal is strong enough, because of jammer output power and/or close proximity to a GPS receiver 10, and close enough to the GPS L1 or L2 frequencies, it may pass through the receiver frontend 12 and into the digital ASIC 16 and particularly into the correlation circuitry 18, where the jamming signal may be tracked as a valid GPS signal. This can cause the tracking loops (not shown) and navigation filters (not shown) of the correlation circuitry 18 and the controller 20 to malfunction, and because these functions incorporate relatively long time constant filters, it may take some time for the GPS receiver 10 to return to normal operation even after the jamming signal is removed.

The jammer response circuitry 38 detects, or is informed by the control and processing unit 74, when the transmit circuitry 72 is transmitting the communication signals, which would be a jamming interference signal in the reception of the GPS signal. The communications signals are signals that are transmitted from the wireless communications device 68 under normal operating conditions. Therefore, by using the control signal CNTL from the jammer response circuitry 38, the digital ASIC has the ability to pause the baseband processing of the very weak L1 or L2 signal, which is typically −133 dBm, while the much stronger communications signal is transmitted from the wireless communications device 68. The control signal CNTL from the jammer response circuitry 38 allows the accumulation circuitry 66 in the digital ASIC 16 to pause accumulation during a transmission from the transmitter. By doing so, the GPS receiver 10 will only see a minimal performance degradation caused by the transmitted signals from the transmit circuitry 72 of the wireless communications device 68. The GPS receiver 10 will also return to normal operation much faster once the transmit circuitry 72 of the wireless communications device 68 stops transmitting. This is because the only filters (energy storage elements) that experience the energy from the jamming interference signal are relatively wide bandwidth filters with time-constants of much less than 1 μs (1 C/A chip).

FIG. 7 illustrates the effect of the control signal CNTL from the jammer response circuitry 38 on the output of the accumulation circuitry 66. As illustrated, the accumulation circuitry 66 temporarily stops accumulation when the control signal CNTL is asserted, thereby signifying a transmission of the jamming interference signal. Further, the output of the accumulation circuitry 66 is constant while the control signal CNTL is asserted. When the control signal CNTL signifies the end of the transmission, the accumulation circuitry 66 resumes accumulation. The ability to temporarily stop accumulation during the transmission of a jamming interference signal allows the GPS receiver 10 to maintain system performance while experiencing only a minimal drop in the signal-to-noise ratio.

Saving Power by Controlling Domain Clocking

According to one embodiment, the controller 20 includes a clock and power management (CPM) module 76 as illustrated in FIG. 8. The clock and power management module 76 allows the controller 20 to control the power consumption of the digital ASIC 16 by controlling the clock signals used to clock the digital ASIC 16. As an example, the digital ASIC 16 can be divided into twelve channel domains, examples of which are a channel$_1$ domain 78 and a channel$_{12}$ domain 80, an integrated phase modulator (IPM) domain 82, a data collect domain 84, an events domain 86, a user time logic domain 88, a receiver circuitry domain 90, and a FFT domain 92 being clocked by clock signals CLK1 ... CLK12, CLK13, CLK14, CLK15, CLK16, CLK17, and CLK18, respectively. Preferably, each of the domains 78, 80, 82, 84, 86, 88, 90, and 92 implements complementary metal-oxide-silicon (CMOS) or similar logic such that power consumption ceases when the logic is not clocked.

The channel domains 78 and 80 include circuitry associated with the channels 40 and 42 and can be powered down when not in use by deactivating the clock signals CLK1 and CLK12, respectively. The IPM domain 82 includes circuitry used by the controller 20 to produce the frequency F and the code having the time OFFSET$_I$ and can be powered down by deactivating the clock signal CLK13. The data collect domain 84 includes circuitry for deriving a noise floor used by the controller 20 to determine a relative magnitude of the data from the correlation circuitry 18 with respect to noise received by the receiver 10, and can be powered down by deactivating the clock signal CLK14. The events domain 86 includes logic used to time stamp input or output data received from or sent to the I/O subsystem 32, and can be powered down by deactivating the clock signal CLK15. The user time logic domain 88 includes logic used to keep a local clock (not shown) that is continuously corrected using the received GPS signals, and can be powered down by deactivating the clock signal CLK16. The receiver circuitry domain 90 includes circuitry not included in the other domains such as the controller 20, the address translation logic 26, and the DMA controller 28, and can be powered down by deactivating the clock signal CLK17. The FFT domain 92 includes the FFT circuitry 30 and can be powered down by deactivating the clock signal CLK18.

The receiver 10 and in particular the digital ASIC 16 of the present invention offer substantial opportunity for variation without departing from the spirit and scope of the invention. For example, the number of correlators N has been shown to be 48 as an example. However, the number N could be any number between 1 and 2046. As another example, the frequency range covered by the 64-point FFT operation is shown to be the approximately 30,000 Hz, but the frequency range could be any range sufficient to overcome errors caused by Doppler and local oscillator imperfections. Further, the number of points in the FFT operation M used to cover the approximately 30,000 Hz range of frequencies could vary depending on particular design requirements. As yet another example, the digital ASIC 16 could be divided into any number of domains, which can be powered down by deactivating the clock signals to the domains.

The foregoing details should, in all respects, be considered as exemplary rather than as limiting. The present invention allows significant flexibility in terms of implementation and operation. Examples of such variation are discussed in some detail above; however, such examples should not be construed as limiting the range of variations falling within the scope of the present invention. The scope of the present invention is limited only by the claims appended hereto, and all embodiments falling within the meaning and equivalency of those claims are embraced herein.

Those skilled in the art will recognize improvements and modifications to the preferred embodiments of the present invention. All such improvements and modifications are considered within the scope of the concepts disclosed herein and the claims that follow.

What is claimed is:

1. A GPS receiver comprising:
   address translation logic adapted to provide a plurality of translated addresses each based on an address from memory access logic;
   said memory access logic adapted to provide each said address to said address translation logic;
   memory adapted to store data in a plurality of memory locations corresponding to said plurality of translated addresses; and
   circuitry adapted to provide said data to said memory based on a signal received by the GPS receiver, wherein said data comprises a plurality of subsets each having a plurality of data elements;

wherein said address translation logic provides said plurality of translated addresses based on organizing said data such that each of said plurality of data elements associated with each of said plurality of subsets are grouped together in said memory, each of said plurality of subsets corresponds to results of a correlation of said signal with a generated frequency and a generated code at a one of a plurality of time offsets, and each of said plurality of data elements in each of said plurality of subsets corresponds to a partial correlation sample from a time limited accumulation of data from the results of the correlation of said signal with said generated frequency and said generated code at said one of said plurality of time offsets.

2. A GPS receiver comprising:
circuitry adapted to provide a serial data stream comprising a plurality of subsets each comprising a plurality of data elements based on a signal received by the GPS receiver;
memory adapted to receive said serial data stream and store said plurality of data elements for each of said plurality of subsets based on a plurality of translated addresses;
memory access logic adapted to provide a plurality of sequential addresses; and
address translation logic adapted to translate said plurality of sequential addresses into said plurality of translated addresses such that, for each of said plurality of subsets, said plurality of data elements for said subset are grouped together in said memory.

3. The GPS receiver of claim 2 further comprising transform circuitry adapted to obtain said plurality of data elements for each of said plurality of subsets and transform said plurality of data elements for each of said plurality of subsets into a frequency domain to produce transformed data.

4. The GPS receiver of claim 2 wherein said circuitry comprises a plurality of correlators each providing said plurality of data elements for a one of said plurality of subsets based on said signal.

5. The GPS receiver of claim 2 wherein said circuitry is further adapted to provide said serial data stream by multiplexing said plurality of subsets.

6. The GPS receiver of claim 2 wherein each of said plurality of subsets corresponds to results of a correlation of said signal with a generated frequency and a generated code at a one of a plurality of time offsets.

7. The GPS receiver of claim 6 wherein each of said plurality of data elements in each of said plurality of subsets corresponds to a partial correlation sample from a time limited accumulation of said results of said correlation of said signal with said generated frequency and said generated code at said one of said plurality of time offsets.

8. The GPS receiver of claim 2 wherein said memory access logic comprises a direct memory access controller.

9. A GPS receiver comprising:
circuitry adapted to provide a serial data stream comprising a plurality of subsets each comprising a plurality of data elements based on a baseband signal;
memory adapted to receive said serial data stream and store said plurality of data elements for each of said plurality of subsets based on a plurality of translated addresses;
memory access logic adapted to provide a plurality of sequential addresses;
address translation logic adapted to translate said plurality of sequential addresses into said plurality of translated addresses such that, for each of said plurality of subsets, said plurality of data elements for said subset are grouped together in said memory; and
a receiver frontend adapted to receive a GPS signal and process the GPS signal to provide said baseband signal.

10. The GPS receiver of claim 9 further comprising transform circuitry adapted to obtain said plurality of data elements for each of said plurality of subsets and transform said plurality of data elements for each of said plurality of subsets into a frequency domain to produce transformed data.

11. The GPS receiver of claim 9 wherein said circuitry comprises a plurality of correlators each providing said plurality of data elements for a one of said plurality of subsets based on said baseband signal.

12. The GPS receiver of claim 9 wherein said circuitry is further adapted to provide said serial data stream by multiplexing said plurality of subsets.

13. The GPS receiver of claim 9 wherein each of said plurality of subsets corresponds to results oft correlation of said baseband signal with a generated frequency and a generated code at a one of a plurality of time offsets.

14. The GPS receiver of claim 9 wherein each of said plurality of data elements in each of said plurality of subsets corresponds to a partial correlation sample from a time limited accumulation of said results of said correlation of said baseband signal with said generated frequency and said generated code at said one of said plurality of time offsets.

15. The GPS receiver of claim 9 wherein said memory access logic comprises a direct memory access controller.

16. A GPS receiver comprising:
means for providing a serial data stream comprising a plurality of subsets each comprising a plurality of data elements based on a signal received by the GPS receiver;
means for storing said plurality of data elements for each of said plurality of subsets based on a plurality of translated addresses;
means for providing a plurality of sequential addresses; and
means for translating said plurality of sequential addresses into said plurality of translated addresses such that, for each of said plurality of subsets, said plurality of data elements for said subset are grouped together in said means for storing.

17. The GPS receiver of claim 16 further comprising means for obtaining said plurality of data elements for each of said plurality of subsets and transforming said plurality of data elements for each of said plurality of subsets into a frequency domain to produce transformed data.

18. The GPS receiver of claim 16 wherein said means for providing said serial data stream is further adapted to provide said serial data stream by multiplexing said plurality of subsets.

19. The GPS receiver of claim 16 wherein each of said plurality of subsets corresponds to results of a correlation of said signal with a generated frequency and a generated code at a one of a plurality of time offsets.

20. The GPS receiver of claim 19 wherein each of said plurality of data elements in each of said plurality of subsets corresponds to a partial correlation sample from a time limited accumulation of said results of said correlation of said signal with said generated frequency and said generated code at said one of said plurality of time offsets.

* * * * *